Aug. 10, 1965  H. A. GRAY  3,199,414
POWER STEERING SYSTEM
Filed May 16, 1963  3 Sheets-Sheet 1

INVENTOR.
HOMER A. GRAY
BY Williams, David,
Hoffmann & Yount
ATTORNEYS

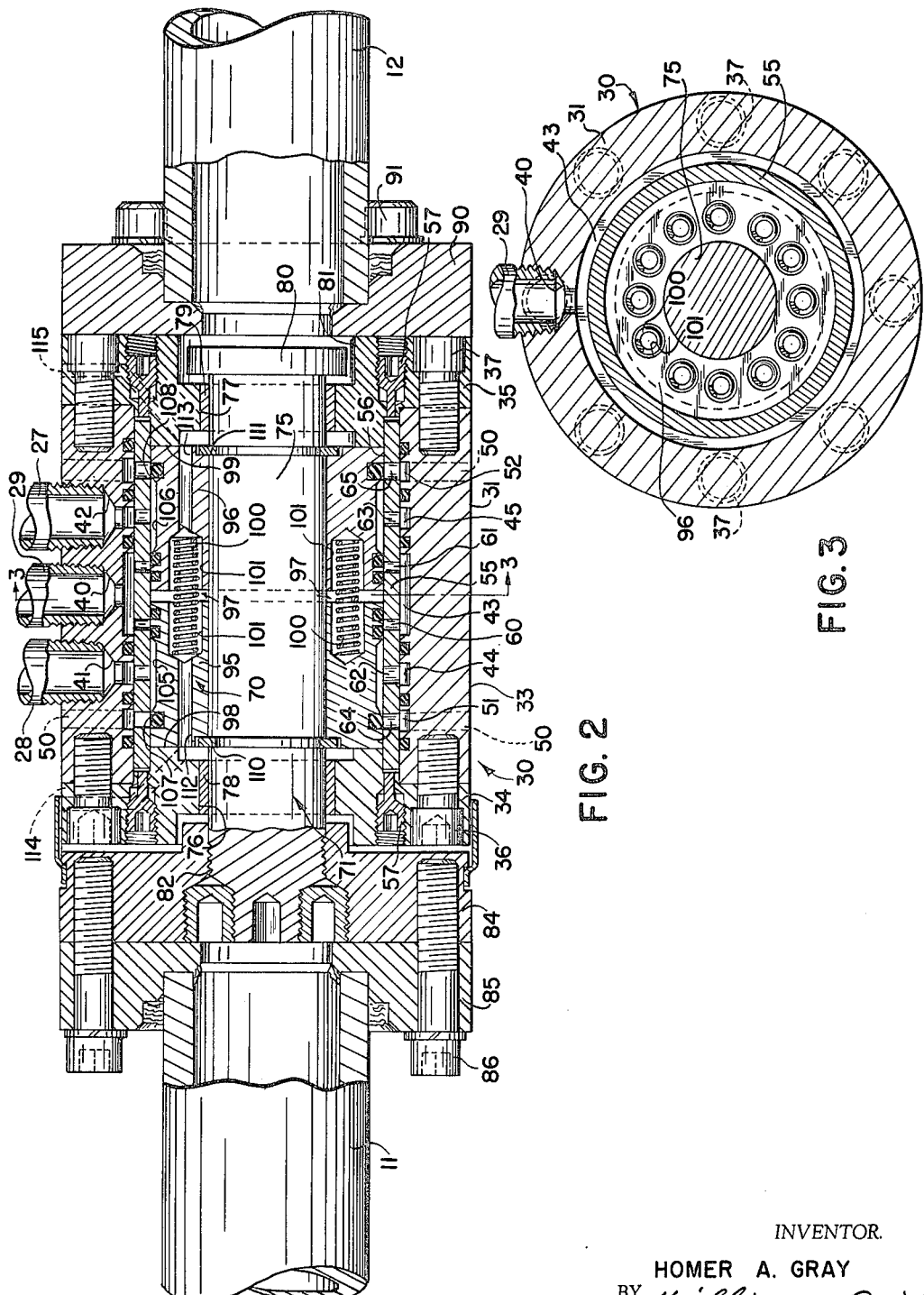

Aug. 10, 1965 H. A. GRAY 3,199,414
POWER STEERING SYSTEM
Filed May 16, 1963 3 Sheets-Sheet 3
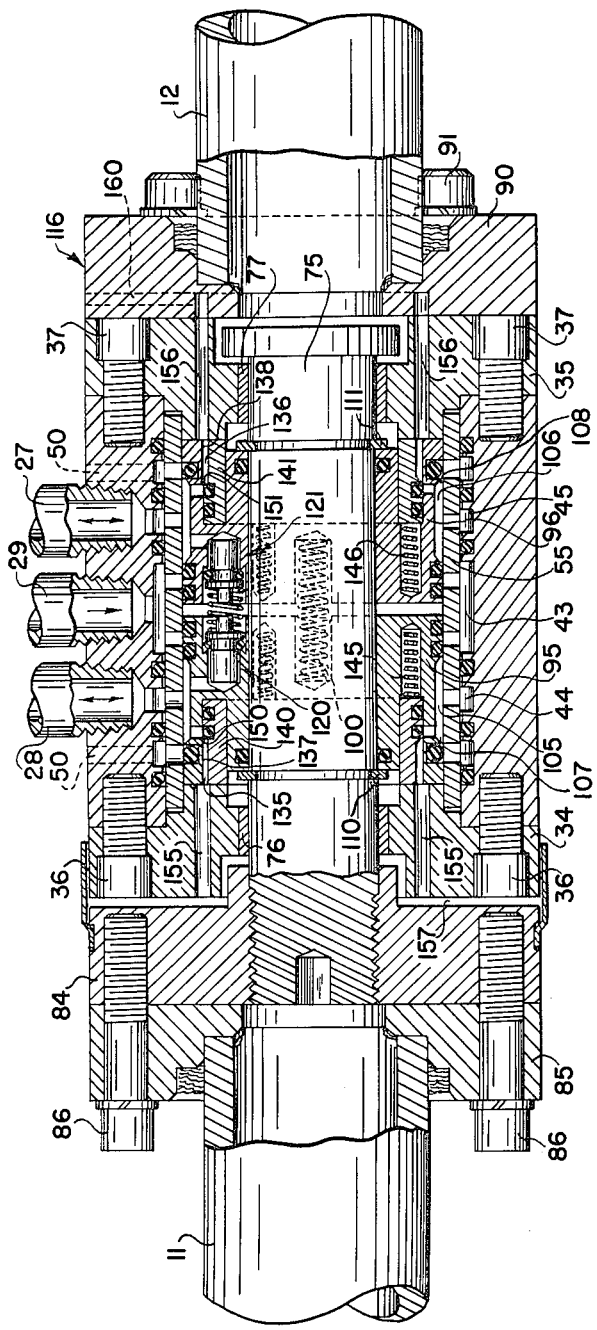
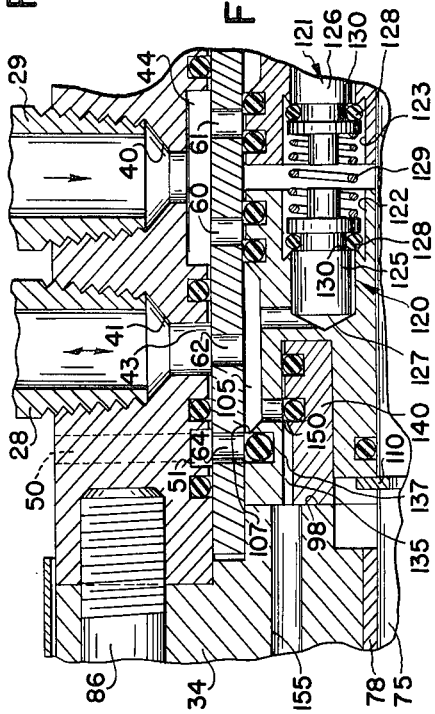
INVENTOR.
HOMER A. GRAY
BY Williams, David,
Hoffmann & Yount
ATTORNEYS United States Patent Office 3,199,414
Patented Aug. 10, 1965

3,199,414
POWER STEERING SYSTEM
Homer A. Gray, Macedonia, Ohio, assignor of one-half to Apsco Manufacturing Corporation, and one-half to Air-O-Matic Power Steer Corporation, both of Cleveland, Ohio, both corporations of Ohio
Filed May 16, 1963, Ser. No. 280,996
16 Claims. (Cl. 91—372)

The present invention relates to a fluid pressure control apparatus, and particularly to a fluid pressure system functioning as a power steering mechanism for a vehicle.

An important object of the present invention is the provision of a new and improved durable and highly reliable control apparatus for use in a power steering system, the apparatus being responsive to relative movement between two members to actuate a fluid motor means and responds quickly to relative movement between the members.

Another important object of the present invention is to provide a new and improved fluid pressure system wherein a control valve having a valve member which has a neutral position from which it is moved to effect operation of a fluid motor is so constructed and arranged that the movement of the valve member required to effect operation of the motor may be substantially less than that of known valve mechanisms.

Another object of the present invention is to provide a new and improved fluid pressure system wherein a fluid pressure motor is controlled by valve mechanism including valve means movable from a neutral position to control the connection of the motor to fluid pressure and exhaust and wherein the valve means is biased against positive stop means when in its neutral position.

A further object of the present invention is to provide a new and improved control valve for sensing relative displacement between two members in which a valve body is connected to one of the members and valve means in said body is connected to the other of said members with the valve means comprising a pair of valve members which are biased to neutral positions by biasing means disposed between the valve members, with one of the members being movable to effect operation of the motor in one direction and the other member being movable to effect operation of the motor in the other direction.

A still further object of the present invention is to provide a new and improved control valve mechanism for maintaining two members in a predetermined relative position which comprises a first valve part connected to one of the members and a second valve part connected to the other of the members, with the valve parts having a neutral relative position from which they are movable in opposite directions to effect operation of the motor in opposite directions, and the first valve part comprising a pair of opposed members which are biased a part, and with the valve members being connected to the associated member by means which causes positive movement of a respective one of the valve members with the member to which it is connected when the latter is moved in a respective direction, the other member being free to move relative to the member to which it is connected.

A still further object of the present invention is to provide a new and improved control valve for controlling the connections of a fluid pressure motor to exhaust and supply including cooperating valve members which are biased by spring means to a relative neutral position with the valve members and spring means being so constructed and arranged that there are no opposing springs which must be balanced in order to determine the neutral position.

An important object of the present invention is to provide a new and improved system for controlling the connection of a fluid pressure motor to a source of fluid pressure and exhaust in response to the relative movement of two members including a fluid pressure control valve for controlling the connections of a fluid pressure motor to exhaust and supply and including cooperating valve members having a relative neutral position and when moved therefrom move against a pressure which is a function of the pressure in the fluid motor.

A further object of the present invention is the provision of a new and improved control apparatus including a control valve which is effective to direct air to an air motor and exhaust air from the motor and wherein the control valve body is provided with a plurality of exhaust ports, and an actuating member movable in the valve body forms a plurality of exhaust passageways leading to the exhaust ports, thus providing for quick exhaust of fluid from the motor.

A further object of the present invention is the provision of a new and improved power steering mechanism including a fluid pressure motor controlled by a control valve having one member movable from a neutral position wherein it is in engagement with positive stop means in response to turning of a steering wheel in one direction, and another member movable from a neutral position wherein it is in engagement with another positive stop member in response to turning of the steering wheel in the other direction, and means biasing the members apart into their neutral positions, thus eliminating need for balancing of springs to determine the neutral positions as required in known prior art structures and providing a power steering mechanism which responds quickly.

A further object of the present invention is the provision of a new and improved vehicle power steering mechanism wherein a fluid motor for actuating turning movement of the wheels of the vehicle is controlled by an actuating member movable in response to turning of the steering wheel and wherein a fluid pressure resistance force is provided resisting movement of the actuating member and is of a magnitude which is a function of the pressure in the fluid motor, thus giving the operator a better "feel" of the roadway.

A further object of the present invention is the provision of a new and improved power steering mechanism, as noted in the next preceding paragraph, wherein the resistance force is provided by a valve means carried by the actuating member and which opens and directs fluid pressure into a chamber into which the actuating member moves.

Further objects and advantages of the present invention will be apparent from the detailed description of a preferred embodiment thereof made with reference to the accompanying drawings forming a part of this specification, and in which:

FIG. 2 is a longitudinal cross-sectional view of a control valve mechanism forming a part of the structure shown in FIG. 1;

FIG. 3 is an axial cross-sectional view of the control valve mechanism shown in FIG. 2 taken approximately along line 3—3 of FIG. 2;

FIG. 4 is a longitudinal cross-sectional view of a modified form of control valve mechanism which may be used in the vehicle of FIG. 1; and FIG. 5 is an enlarged fragmentary view of the valve shown in FIG. 4.

Figure 1:
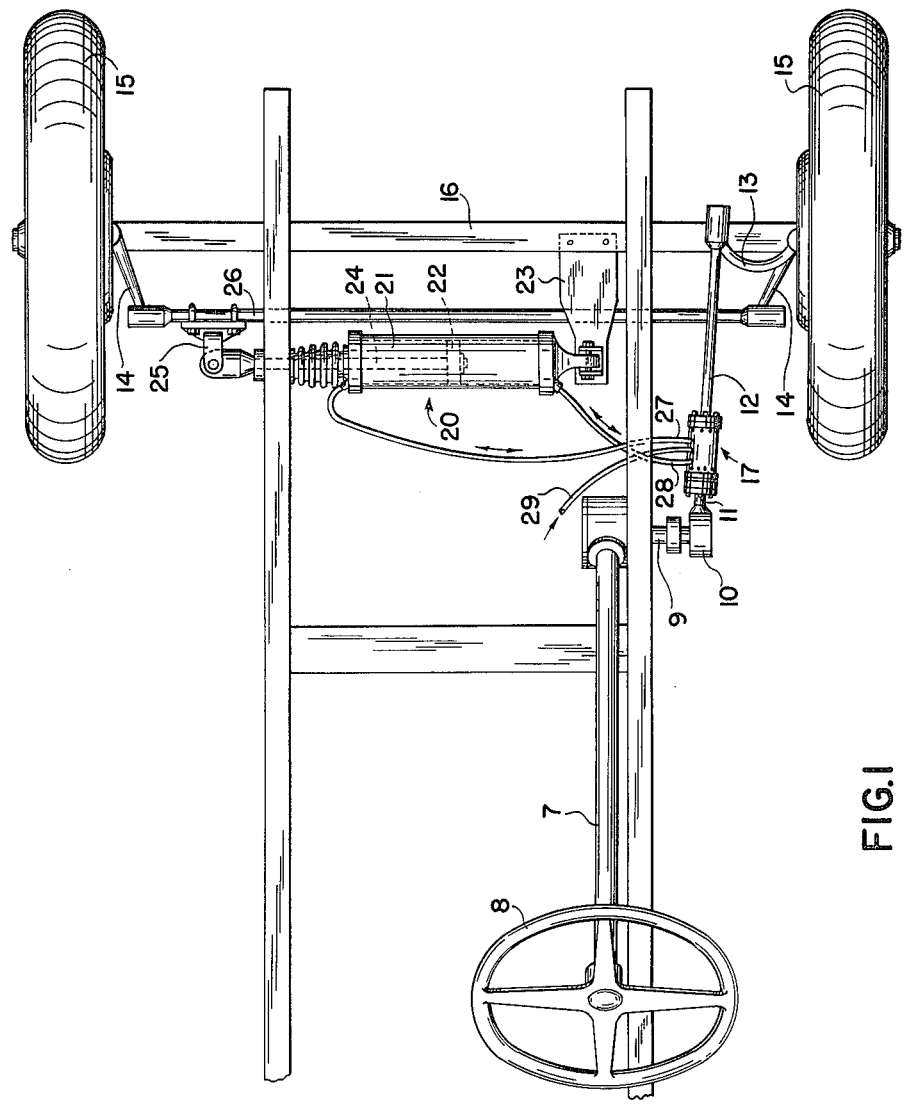
FIG. 1 is a schematic view of a portion of a vehicle embodying the present invention.

The present invention is illustrated as embodied in a power steering system for an automotive vehicle. The power steering system includes a steering column 7 on which a steering wheel 8 is secured. The steering column 7 is connected by suitable gearing to a short shaft member 9 which is connected with a pitman arm 10 arranged to be swung back and forth upon rotation of the shaft 9 by turning of the steering wheel 8. The pitman arm 10 is connected to a drag link mechanism including a rod member 11 one end of which is connected with the pitman arm 10 and a rod member 12 which is connected to an element 13 which in turn is joined with a link 14 which when actuated turns the dirigible wheels 15 of the vehicle which are mounted on a front axle 16 of the vehicle.

The drag link assembly includes a valve mechanism 17 which interconnects the rod members 11, 12 and in response to relative movement between the rod members 11, 12 actuates a fluid motor 20 which in turn assists the turning movement of the wheels 15 of the vehicle. The motor 20 preferably is a double acting air motor and includes a double ended cylinder 21 having a chamber therein in which a piston 22 is movable in opposite directions. The cylinder 21 is connected at one end to a bracket 23 secured to the front axle 16 of the vehicle, and a piston rod 24 is pivoted at its outer end to a bracket 25 secured to a tie rod 26 connected between the links 14 adjacent the wheels 15. Flexible pressure fluid conduits or conductors 27, 28 connect the opposite ends of the cylinder 21 to the valve mechanism 17.

The conduits 27, 28 function as fluid pressure supply and exhaust conduits for the motor 20 and the valve mechanism controls tht connection of the conduits to exhaust and to a pressure conduit 29 from a compressed air supply. When the motor is to operate in one direction the conduit 27 is connected to the pressure conduit and the conduit 28 to atmosphere by the valve mechanism 27 and when it is to operate in the opposite direction the connections are interchanged.

Referring now to FIG. 2, the valve mechanism 17 comprises a valve body or housing 30 including a cylindrical hollow valve body member 31 having a passage therethrough and an outer annular peripheral surface 33. The valve body 30 also includes end wall members 34, 35 secured to opposite ends of the valve body member 31 by suitable screws 36, 37, respectively.

The cylindrical body member 31 is provided with fluid inlet port means and fluid outlet port means. The fluid inlet port means includes fluid opening 40 which receives fluid supply conduit 29. The fluid outlet port means includes fluid openings 41, 42 which receive the conduits 28, 27, respectively. The openings 40, 41 and 42 are connected with annular grooves 43, 44, and 45, respectively, which extend circumferentially around the inner wall of the annular body member 31. The body member 31 also has a plurality of exhaust ports 50 located at the opposite ends thereof and which are connected with grooves 51, 52 which also extend around the inner surface of the body member 31 and are located at the opposite ends thereof, respectively.

A cylindrical liner sleeve member 55 having an axial passage or chamber 56 therein is positioned in the valve body in engagement with the inner surface of the hollow body member. The sleeve 55 is engaged at its opposite ends by positioning screws 57 which are threaded into the respective end walls 34, 35 and which have portions which engage the opposite ends of the sleeve member 55 and secure the sleeve member in position in the valve body member 31.

The sleeve member 55 has a plurality of fluid passages or openings therein which communicate with certain of the grooves in the inner surface of the annular body member 31 and with the passage or chamber 56 therein and direct fluid from and into the chamber 56, as will be described. As illustrated in the drawings, there are two sets of openings 60 and 61 in the sleeve member which communicate with the groove 43 and there are two openings in the sleeve member spaced outwardly from the openings 60, 61 and designated in the drawings 62, 63, which communicate, respectively, with the annular grooves 44, 45. Openings 64, 65 in the sleeve member communicate with the annular grooves 51, 52, respectively. Suitable O-ring seals are provided between the body member 31 and the sleeve member 55 to prevent leakage of fluid therebetween.

The valve mechanism 17 also includes piston means 70 located in the passage or chamber 56 and which is responsive to movement of the steering wheel 8. The piston means 70 is moved in response to movement of the steering wheel 8 by suitable actuating means 71 which in the illustrated embodiment includes an actuating shaft member 75 which extends through openings 76, 77 in the end wall members 34, 35, respectively. The shaft member 75 is supported for sliding movement in the openings 76, 77 by bearing means 78, 79, respectively. The right end of the shaft member 75, as viewed in FIG. 2, is provided with an enlarged head 80 thereon which is located in a recessed portion 81 of the end wall 35.

The end of the rod member 75 opposite the end having the head 80 thereon includes a threaded portion 82 onto which an end cap 84 is threaded. End plate means 85 is secured to the outer surface of the end cap 84 by means of a plurality of screws 86, and the end plate means 85 in turn is suitably secured to the rod member 11 forming a part of the drag link mechanism and which is moved upon turning of the steering wheel.

The end wall member 35 is secured to an end plate means 90 similar to end plate means 85 by suitable screws 91. The end plate means 90 is secured in a suitable manner to the rod 12 forming a part of the drag link mechanism, as described above. From the above description it should be apparent that the rod member 11 and shaft member 75 move to the right and left together as they are viewed in FIG. 2 and that the rod member 12 moves with the wheels 15 as they turn dirigibly.

The piston mechanism 70 includes first and second cylindrical sleeve-like piston or valve members 95, 96 which are slidably supported on the shaft 75 in side by side relationship and which are biased by spring means 97 disposed between the members into normal or neutral positions in engagement with abutment portions 98, 99, respectively, on the end wall members 34, 35 respectively.

The spring means 97 comprises a plurality of coil springs 100, there being twelve shown in the drawings. The coil springs are disposed between the facing surfaces of the respective piston members 95, 96. The springs bias the respective piston members apart into their normal positions and the opposite ends of each of coil springs 100 are received in individual recesses 101 in the piston members 95, 96, respectively.

The piston members 95, 96 are provided with fluid conducting grooves 105, 106, respectively, extending axially and circumferentially about their outer annular surfaces adjacent the sleeve member 55. Suitable O-ring seals are provided between the piston members 95, 96 and the sleeve member 55 to prevent leakage of fluid therebetween. The grooves 105, 106 connect the conduits 27, 28, respectively, to the atmosphere when the piston members are in their normal or neutral positions, as illustrated in FIG. 2. When the piston members are in their neutral positions the grooves 105, 106 communicate with conduits 27, 28, respectively, through openings 62, 63, respectively, in the sleeve member 55. When the piston members are in their neutral positions fluid passages are provided at 107, 108 connecting grooves 105, 106 with openings 64, 65, respectively, in the sleeve member, which in turn communicate with the exhaust grooves 51, 52, respectively. Thus, it should be apparent that when the piston members 95, 96 are in their neutral positions the opposite ends of the fluid motor 20 are vented.

The grooves 105, 106 in the piston members 95, 96 form a fluid passage for connecting the fluid supply conduit 29 with the conduits 28, 27, respectively, when the piston members are moved from their normal positions.

When the piston member 95 moves from its normal position groove 105 no longer communicates with opening 64 leading to exhaust, but communicates with openings 60 in the sleeve member and provides for fluid flow to one end of chamber 21 through conduit 28, while piston 96 vents the other end of chamber 21, as above described. When the piston member 96 moves from its vertical position, groove 106 no longer communicates with opening 65 leading to exhaust, but communicates with openings 61 and 63 in the sleeve member and provides for fluid flow to one end of chamber 21 through conduit 27, while piston 95 vents the other end of chamber 21, as above described.

One of the piston members 95, 96 is moved relative to the valve sleeve when fluid is to be supplied to the cylinder 21. To this end, the shaft member 75 supports spaced split rings 110, 111 between which the piston members 95, 96, are disposed with the rings 110, 111 being disposed to engage the outer end surface of the adjacent piston members 95, 96, respectively. The piston members 95, 96 engage the split rings 110, 111, respectively, when the latter are in their normal positions. Upon movement of shaft 75 to the right, as viewed in FIG. 2, the split ring 110 causes the piston member 95 to move along with the shaft 75 and to urge the piston member 96 and the valve body and rod 12 to move with the rod 11. If the turning resistance is sufficient to compress the spring means 97 the piston 95 moves relative to the sleeve 55, and the groove 105 connects opening 60 in the sleeve member 55 with the opening 62 in the sleeve member 55 to supply pressure fluid to conduit 28 and closes the passage 107 which connects the groove 105 to exhaust, as above described. Thus, the fluid supply conduit 29 is connected with the conduit 28 directing fluid to the lower end of the cylinder 20, as illustrated in FIG. 1. As the motor operates and the rod 12 follows the rod 11, the valve mechanism will be returned toward its neutral position.

Upon movement of the shaft member 75 with rod 11 to the left, as viewed in FIG. 2, the split ring 111 causes the piston member 96 through spring means 97 to move along with shaft 75 and to urge the piston member 95 and the valve body and rod 12 to move with rod 11. If the turning resistance is sufficient to compress spring means 97, the piston member 96 moves relative to the sleeve 55, and the passage 108 is thus blocked and the groove 106 connects the opening 63 in the sleeve member 55 with the opening 61 therein and thus connects the fluid supply conduit 29 with the conduit 27 as above described.

The valve 17 includes vent means for venting the space between the piston members 95, 96 to the atmosphere and preventing a pressure build-up therein due to leakage. The vent means includes drilled passages 112, 113 in the members 95, 96, respectively, communicating with passages 114, 115 in the end wall members 34, 35, respectively. The passages 114, 115 communicate with the atmosphere around the valve housing and vent the space between the piston members to the atmosphere.

It should be apparent that through the use of the spring means 97 which engage and bias the piston members 95, 96 apart and into engagement with positive stop means a uniform and quick operation of the valve is achieved. The piston or valve members 95, 96 thus have positive neutral positions from which they move and thus the openings in the valve body and sleeve member 55 can be accurately positioned to provide for operating the fluid motor when the valve members move a relatively small distance from their neutral position, thus making the present valve respond quicker than the known valves. Moreover, through the provision of a plurality of coil springs, in the event one spring breaks the cylinder mechanism is still operative. Furthermore, the use of the spring means biasing the first and second piston members apart does not require any balancing of springs, as in known power steering mechanisms.

Referring now to FIG. 4 of the drawings, a control valve 116 is shown therein of substantially the same construction as the control valve mechanism 17 shown in FIG. 2, which was described hereinabove. Since the control valve 116, shown in FIG. 4, is of substantially the same general construction and of substantially the same general operation as control valve mechanism 17, control valve 116 will not be described in detail herein. The reference characters used to designate parts of the control valve mechanism 17 in FIG. 2 are used to designate the corresponding parts of the control valve 116 in FIG. 4.

In addition to the structure which corresponds with the structure of the valve 17 shown in FIG. 2, the valve 116 shown in FIG. 4 includes resistance means for providing a fluid force which acts against the piston members 95, 96 to resist movement thereof, which force has magnitude which is a function of the fluid pressure in the motor 20 and thus provides a better "feel" of the road for the operator of the vehicle. The resistance means includes valve means 120, 121 located in the piston members 95, 96, respectively. The valve means 120, 121 include fluid passageways 122, 123 in the piston members 95, 96, respectively, connecting the grooves 105, 106 with the space between the piston members. The valve means 120, 121 also include movable valve stems 125, 126, respectively. Each of the valve stems 125, 126 has an enlarged surface 127 located in the fluid stream, and fluid flowing through the passageways 122, 123 applies a force against the surface 127, located in passageways 122, 123, respectively. Each valve stem also supports an O-ring 128. The O-ring 128 is undersized and does not engage the bore of the passage in which it is positioned. Relatively light spring means 129 is provided biasing the stems 125, 126 into a valve closed position wherein the O-rings 128 engage a valve seat 130, in the passageways 122, 123, and block the flow of fluid therethrough.

When the fluid pressure acting against surface 127 of the valve stems is sufficient to overcome the force holding the valves closed, the valves open. The force holding the valves closed is, of course, provided by the spring 129 and any fluid trapped between the piston members. The pressure acting against valve stem surfaces 127 tending to move the valves to an open position is substantially the same as the pressure required to move the piston 22. Thus, when the valves 120, 121 open, an increase in fluid pressure is provided in the chamber between the piston members 95, 96 and is of a magnitude which is a function of the pressure in the fluid motor. Thus a force is provided resisting movement of the piston members, which force is provided by spring 129 and the increased fluid pressure. This force is substantially equal to the force moving the piston 22 which, of course, is a function of the resistance to movement of the piston 22. This gives the operator a "feel" of the roadway.

Upon movement of the piston member 95 the groove 105 thereof connects the opening 60 of the sleeve member 55 with the opening 62 of the sleeve member and at the same time blocks flow to groove 64 connecting the groove 105 to exhaust, as described above in connection with the embodiment shown in FIG. 2. This movement of the piston 95 provides a fluid pressure in the groove 105 equal to the pressure in cylinder 21. This fluid pressure is conducted to the surface 127 of the valve stem 125 through the passageway 122 and applies a fluid force against the surface 127 causing the stem 125 to move to the right against the bias of spring means 129, if sufficient force as discussed above has been provided. This causes the valve means 120 to open and direct fluid from the groove 105 through the passageway 122 into the chamber between the piston members.

It should be apparent that the fluid pressure which is directed into the chamber between the piston members provides a force which resists movement of the piston member 95 which force increases with an increase in the pressure in cylinder 21, which pressure varies with the resistance which the piston member 95 encounters. Thus as a result, the force required to turn the steering wheel becomes progressively greater as the resistance to movement of piston 22 becomes greater due to the fact that the piston member 95 must be moved against the greater force. This gives the operator a better "feel" of the road, and upon return of the steering wheel this fluid force provides for uniform returning of the piston member which was moved and the valve housing at substantially uniform rates, and prevents the valve housing from returning at a faster rate than the piston member which would have a detrimental effect on the operation of the power steering mechanism.

The valve means 121 which is located in the piston member 96 operates in exactly the same way as described above in connection with valve means 120 in piston member 95. Therefore, operation of the valve member 121 will not be described in detail.

The valve 116 shown in FIG. 4 also includes additional exhaust means located in each piston member 95, 96 and provides for quicker exhaust of the fluid from the cylinder 21 of the motor 20 than is provided by the valve of FIG. 2. This additional exhaust means, best shown in FIG. 5, includes exhaust fluid passageways 135, 136 formed in the piston members 95, 96, respectively. The fluid passageways 135, 136 are defined by the wall portion of passages 137, 138 in the piston members 95, 96, respectively, and by a surface portion of sleeve members 140, 141, respectively, which are slidably closely mounted in the passages 137, 138. The sleeve members 140, 141 are biased by springs 145 and 146 into engagement with the abutment portions of the end wall members 34, 35, respectively, when the piston members are in their normal positions. When the respective piston members 95 and 96 are in their normal positions, as illustrated in FIG. 5, the springs 145, 146, respectively are compresssed and the passageways 135, 136 are connected to the grooves 105, 106, respectively, by fluid connecting conduit portions 150, 151, respectively, in the piston members. The conduit portions 150, 151 readily provide for exhausting the fluid from the grooves 105, and 106 through the connecting portions and through the passageways 135, 136.

The passageways 135, 136 connect with a plurality of openings 155, 156, respectively, located in the end wall members 34, 35, respectively. The openings 155 in the end wall 34 connect with a chamber 157 located between the end cap 34 and the end wall 34 of the valve. The chamber 157 is open to the atmosphere and therefore compressed air is exhausted from the passageway 135 to the atmosphere. The openings 156 in the end wall 35 are connected to suitable passageways 160 formed in the end plate means 90 and connect the passageway 136 to the atmosphere, and thus provide for exhaust of the compressed air to the atmosphere when the piston member 96 is in its normal position.

When the piston members 95, 96 move, the sleeve members 140, 141, respectively, are held by the springs 145, 146 against the abutment means 98, 99. Thus the piston member move relative to the sleeves and the conduit portions 150, 151, repectively, close. Thus, when one piston member moves to connect the inlet port means to the outlet port means the exhaust therethrough is blocked.

While the preferred embodiments of the present invention have been described hereinabove in considerable detail it should be understood that certain modifications and changes in construction thereof may be made and it is intended hereby to cover all changes, modifications, and constructions of the present invention falling within the scope of the appended claims.

Having described my invention, I claim:

1. A control device for actuating a fluid motor in opposite directions for turning the wheels of a vehicle in opposite directions in response to turning of the steering wheel of the vehicle in opposite direction comprising, a hollow valve body having an inlet port and first and second outlet ports adapted to be connected to opposite portions of said motor, a first member movable in said body from a first position and having means for communicating said first outlet port with said inlet port to provide a first fluid passageway through the valve upon movement from its first position, a second member movable in said body relative to said first member from a first position and having means for communicating said second outlet port with said inlet port to provide a second fluid passageway through the valve upon movement from its first position, said first and second members when in their respective first positions defining a chamber therebetween, spring means located in said chamber engaging said first and second members and biasing said members away from each other and into their said first positions, means blocking the flow of fluid into said chamber when said first and second members are in their said first positions, and means adapted to be operatively connected with the steering wheel for movement in opposite directions upon turning of the steering wheel in opposite directions for selectively moving one of the members against the bias of said spring means relative to the other of said members and relative to said valve body to provide a fluid passage through the valve.

2. A device as recited in claim 1 wherein said means for selectively moving one of said members comprises an actuating member extending through passages located centrally of said first and second members and having abutment means thereon engaging portions of said first and second members opposite the portions thereof engaged by said spring means and movable in opposite directions to selectively move one of said members.

3. A device as recited in claim 1 wherein said first and second members have a plurality of openings in the adjacent surfaces thereof and said openings in each member are aligned with the openings in the other member, and said spring means comprises a plurality of coil springs each of which is received in one set of aligned openings in the first and second members.

4. A control device for actuating a fluid motor for turning the wheels of a vehicle in response to turning of the steering wheel of the vehicle comprising a hollow valve body member having inlet port means and outlet port means adapted to be connected to said motor, a piston member movable in said body member from a first position and having means providing a fluid passageway connecting said inlet and outlet port means upon movement from said first position, an abutment member in said body spaced from said piston member when in its said first position, said piston member and said abutment member defining a chamber therebetween, means adapted to be operatively connected with the steering wheel for movement therewith and for moving said piston member for said first position toward said abutment member, and valve means operatively connected with said inlet port means and said chamber and having an open position for providing a fluid pressure in said chamber and thereby providing a fluid force resisting the movement of said piston member toward said abutment member and a closed position blocking flow of fluid to said chamber.

5. A device as defined in claim 4 wherein said abutment means comprises another piston member movable in said body member from a first position toward the one piston member, said another piston member having means providing a fluid passage connecting said inlet and outlet port means upon movement from its first position, and wherein said valve means further comprises means adapted to be connected to the steering wheel for moving said another piston member in said body toward said one piston member, and another valve means in said another piston member operatively connected with said inlet port means and said chamber for providing a fluid pressure in said chamber and a force resisting the movement of said another piston member toward said one piston member.

6. A device as defined in claim 5 further including a plurality of springs engaging portions of said one and another piston members and biasing said one and another piston members into their respective first positions.

7. A control apparatus comprising, a hollow valve body having inlet port means and outlet port means, a piston member movable in said body from a first position and having means providing a fluid passageway connecting said inlet and outlet port means upon movement from said first position to apply a fluid pressure to said outlet port, an abutment member in said body spaced from said piston member when in its said first position, said piston member and said abutment member defining a chamber therebetween, means for moving said piston member from said first position toward said abutment member, and valve means operatively connected to said fluid passageway and said chamber and having an open position providing a fluid pressure in said chamber of a magnitude which is a function of the fluid pressure in said outlet port and thereby providing a force resisting the movement of said piston member toward said abutment means which is substantially equal to the outlet port pressure.

8. A control apparatus as defined in claim 7 wherein said abutment means comprises another piston member movable in said body member from a first position toward the one piston member, said another piston member having means providing a fluid passage connecting said inlet and outlet port means upon movement from its inoperative position, and wherein said control apparatus further comprises means for moving said another piston member in said body toward said one piston member, and another valve means in said another piston member operatively connected with said fluid passage and said chamber to provide a force resisting the movement of said another piston member toward said one piston member substantially equal to the force acting to operate said fluid motor.

9. A device for moving the wheels of a vehicle in response to movement of the steering wheel of the vehicle, comprising a fluid motor having a piston member movable in a chamber in opposite directions upon the application of fluid pressure to opposite portions of said chamber and adapted to be operatively connected to the wheels of the vehicle to actuate movement of the wheels in opposite directions, fluid supply means for supplying fluid to said fluid motor including a control valve, said control valve including a hollow valve housing having an inlet port and first and second outlet ports, a liner extending throughout said valve housing and having radially directed passages communicating with said inlet port and first and second outlet ports, fluid conduit means communicating said first and second outlet ports with respective opposite portions of said chamber, a first piston member movable in said liner from a first position and having conduit means providing upon movement a fluid passageway communicating one of the passages in said liner communicating with said first outlet port with a passage in the liner communicating with said inlet port, a second piston member movable in said liner from a first position and having conduit means providing upon movement a fluid passageway communicating another passage in said liner communicating said inlet port with a further passage in said liner communicating with said second outlet port, spring means biasing said first and second members away from each other and into their said first positions, and means adapted to be operatively connected to said steering wheel for selectively moving one of said members in said liner depending upon the direction of movement of the steering wheel from its said inoperative position against the bias of said spring means relative to said other of said members to apply a fluid pressure to one portion of said chamber to cause movement of said piston member in said chamber and movement of said wheels.

10. A device as defined in claim 9 wherein said liner includes further radially extending vent passageways therethrough communicating with the atmosphere for venting, said piston members supporting means partially blocking said vent passageways when in said first position, and said passageways in said piston members communicating with said outlet ports and said unblocked portion of said vent passageways when said piston members are in their said first position.

11. A device as defined in claim 9 wherein said first and second piston members have a plurality of openings in the adjacent surfaces thereof and said openings in each piston member are aligned with the openings in the other piston member, and said spring means comprises a plurality of coil springs each of which is received in one set of aligned openings in the first and second piston members.

12. A control device comprising a hollow valve body having a fluid supply inlet port and first and second outlet ports, said valve body including a plurality of exhaust ports for exhausting fluid therefrom, a first member movable in said body from a first position and including means connecting one of said outlet ports with a first plurality of exhaust ports when in its said first position forming a first exhaust passageway, means for blocking said one outlet port from said first plurality of exhaust ports upon movement from said first position, and means for communicating said inlet port with said one of said outlet ports upon movement from said first position thus forming a first fluid supply passageway through the valve body, a second member movable in said body from a first position and including means connecting another of said outlet ports with a second plurality of exhaust ports when in its said first position forming a second exhaust passageway, means for blocking said another of said outlet ports from said second plurality of exhaust ports upon movement from its said first position, and means for communicating said inlet port with said another of said outlet ports upon movement from said first position forming a second fluid supply passageway through the valve body, means adapted to be connected to said members for selectively moving one of said members relative to the other to provide for flow of fluid through the fluid supply passageway formed by said one member and venting through said exhaust passage formed by said another member, and said means communicating said outlet ports with said exhaust ports comprising a fluid passageway in said members defined by the surface of a passage in said members and the surface of a sleeve member positioned in said passage and slidable therein relative to said members and spring means biasing said sleeve members to a position providing said exhaust passageways and moving said sleeve member relative to said piston members upon movement thereof from said first positions to block said exhaust passageways.

13. A control device for actuating a fluid motor for turning the wheels of a vehicle in response to turning of the steering wheel of the vehicle comprising a hollow valve body member having inlet port means and outlet port means adapted to be connected to said motor, a piston member movable in said body member from a first position and having means providing a fluid passageway connecting said inlet and outlet port means upon movement from said first position, an abutment member in said body spaced from said piston member when in its said first position, said piston member and said abutment member defining a chamber therebetween, means adapted to be operatively connected with the steering wheel for movement therewith and for moving said piston member from said first position toward said abutment member, and valve means operatively connected with said inlet port means and said chamber for providing a fluid pressure in said chamber and thereby providing a fluid force resisting the movement of said piston member toward said abutment member, and said piston member is provided with a fluid passage connecting said fluid passageway and said chamber and said valve means comprises a valve member mounted in said passageway in said piston member and movable therein by fluid pressure to an open position.

14. A device as defined in claim 13 further including a fluid motor and said outlet port being connected to said fluid motor and the force resisting said movement of said piston member being substantially equal to the pressure in said fluid motor.

15. A control device for actuating a fluid motor for turning the wheels of a vehicle in response to turning of the steering wheel of the vehicle comprising a hollow valve body having a fluid supply inlet port and first and second outlet ports adapted to be connected to the motor, said valve body including a plurality of exhaust ports for exhausting fluid from the motor, a first member movable in said body from a first position and including means connecting one of said outlet ports with a first plurality of exhaust ports when in its said first position forming a first exhaust passageway, means for blocking said one outlet port from said first plurality of exhaust ports upon movement from said first position, and means for communicating said inlet port with said one of said outlet ports upon movement from said first position thus forming a first fluid supply passageway through the valve body, a second member movable in said body from a first position and including means connecting another of said outlet ports with a second plurality of exhaust ports when in its said first position forming a second exhaust passageway, means for blocking said another of said outlet ports from said second plurality of exhaust ports upon movement from its said first position, and means for communicating said inlet port with said another of said outlet ports upon movement from said first position forming a second fluid supply passageway through the valve body, and means adapted to be connected to said steering wheel for selectively moving one of said members relative to the other upon movement of the steering wheel to provide for flow of fluid through the fluid supply passageway formed by said one member, and exhaust from said motor through said exhaust passageway formed by said another member, said means communicating said outlet ports with said exhaust ports comprising a fluid passageway in said members defined by the surface of a passage in said members and the surface of a sleeve member positioned in said passage and slidable therein relative to said members and spring means biasing said sleeve members to a position providing said exhaust passageways and moving said sleeve member relative to said piston members upon movement thereof from said first positions to block said exhaust passageways.

16. A control apparatus comprising a fluid motor, a hollow valve body having inlet port means and outlet port means leading to said fluid motor, a piston member movable in said body from a first position and having means providing a fluid passageway connecting said inlet and outlet port means upon movement from said first position to apply a fluid pressure in said motor to actuate said motor, an abutment member in said body spaced from said piston member when in its said first position, said piston member and said abutment member defining a chamber therebetween, means for moving said piston member from said first position toward said abutment member, and valve means operatively connected to said fluid passageway and said chamber to provide a fluid pressure in said chamber of a magnitude which is a function of the fluid pressure in said fluid motor and to provide a force resisting the movement of said piston member toward said abutment means which is substantially equal to the fluid pressure in said fluid motor, said piston member being provided with a fluid passage connecting said fluid passageway and said chamber and said valve means comprising a valve member mounted in said passageway in said piston member and movable therein by fluid pressure to an open position.

References Cited by the Examiner

UNITED STATES PATENTS

| 1,848,923 | 3/32 | Almen | 91—391 |
| 2,283,810 | 5/42 | Johnson | 91—374 |
| 2,788,770 | 4/57 | Folkerts | 91—372 |

FOREIGN PATENTS 629,886  10/61  Canada.

FRED E. ENGELTHALER, *Primary Examiner.*

SAMUEL LEVINE, *Examiner.*